US009732647B2

(12) United States Patent
Daborn et al.

(10) Patent No.: US 9,732,647 B2
(45) Date of Patent: Aug. 15, 2017

(54) PASSENGER SERVICE VEHICLE

(71) Applicant: Alexander Dennis Limited, Falkirk (GB)

(72) Inventors: Mark Daborn, Larbert (GB); Simon Bowers, Surrey (GB)

(73) Assignee: Alexander Dennis Limited, Falkirk (GB)

(*) Notice: Subject to any disclaimer, the term of this patent is extended or adjusted under 35 U.S.C. 154(b) by 105 days.

(21) Appl. No.: 14/218,423

(22) Filed: Mar. 18, 2014

(65) Prior Publication Data

US 2014/0262590 A1 Sep. 18, 2014

(30) Foreign Application Priority Data

Mar. 18, 2013 (GB) .................................. 1304945.7

(51) Int. Cl.
*B60K 13/04* (2006.01)
*F01N 3/035* (2006.01)
*F01N 3/021* (2006.01)
*F01N 13/18* (2010.01)
*F01N 13/00* (2010.01)

(52) U.S. Cl.
CPC .............. *F01N 3/035* (2013.01); *B60K 13/04* (2013.01); *F01N 3/0211* (2013.01); *F01N 13/0093* (2014.06); *F01N 13/1811* (2013.01); *F01N 2490/06* (2013.01); *Y02T 10/24* (2013.01)

(58) Field of Classification Search
None
See application file for complete search history.

(56) References Cited

U.S. PATENT DOCUMENTS

| 4,907,666 A * | 3/1990 | Tecco | B60K 13/04 180/309 |
| 6,802,387 B1 * | 10/2004 | Kreger | F01N 3/005 181/212 |
| 7,717,205 B2 * | 5/2010 | Kertz | B60K 13/04 180/68.1 |
| 8,191,668 B2 * | 6/2012 | Keane | B60K 13/04 180/296 |

(Continued)

FOREIGN PATENT DOCUMENTS

| EP | 2 199 554 A1 | 6/2010 |
| EP | 2 518 287 A1 | 10/2012 |

(Continued)

OTHER PUBLICATIONS

United Kingdom Intellectual Property Office, Patents Act 1977: Examination Report Under Section 18(3), dated Sep. 26, 2016, for Patent Application No. GB1304945.7.

*Primary Examiner* — Katy M Ebner
(74) *Attorney, Agent, or Firm* — Young Basile Hanlon & MacFarlane, P.C.

(57) ABSTRACT

Exhaust systems and passenger service vehicles, for example, buses are used together. The exhaust system can be arranged, in use, to be above an engine compartment. The exhaust system includes a first filter and a second filter, each filter having an inlet and an outlet. The inlets are inline with the respective first and second filters, and the outlets are transversely arranged with reference to the respective filters. Vehicles may have an overall length of about 35 feet or less and have an unladen weight of around 25,000 lbs or less.

13 Claims, 2 Drawing Sheets

(56) References Cited

U.S. PATENT DOCUMENTS

| | | | | |
|---|---|---|---|---|
| 8,371,109 B2* | 2/2013 | Endo | B60K 13/04 | 60/295 |
| 8,407,991 B2* | 4/2013 | Yokota | B60K 13/04 | 180/326 |
| 8,505,661 B2* | 8/2013 | Tsuji | E02F 3/7609 | 180/68.4 |
| 8,573,646 B2* | 11/2013 | Kamiya | B60K 13/04 | 180/89.2 |
| 8,814,969 B2* | 8/2014 | Nagasaka | B01D 46/0043 | 422/169 |
| 8,851,224 B2* | 10/2014 | Hayashi | B60K 13/04 | 180/296 |
| 8,931,266 B2* | 1/2015 | Uchida | B60K 13/04 | 180/296 |
| 8,960,359 B2* | 2/2015 | Nogami | B60K 11/06 | 180/296 |
| 8,997,468 B2* | 4/2015 | Kondo | F01N 13/002 | 60/295 |
| 9,010,095 B2* | 4/2015 | Himoto | E02F 9/0833 | 180/296 |
| 9,016,426 B2* | 4/2015 | Himoto | E02F 9/0833 | 180/296 |
| 9,033,095 B2* | 5/2015 | Sakai | F01N 13/1805 | 180/309 |
| 9,061,582 B2* | 6/2015 | Sawada | B60K 13/04 | 180/309 |
| 9,163,380 B2* | 10/2015 | Homma | E02F 9/0833 | |
| 9,180,774 B2* | 11/2015 | Mizuno | B60K 13/04 | |
| 2008/0115989 A1* | 5/2008 | Matte | F01N 3/021 | 180/68.1 |
| 2011/0079003 A1* | 4/2011 | Sun | F01N 3/2066 | 60/310 |
| 2012/0247861 A1 | 10/2012 | Mizuno et al. | | |
| 2012/0273648 A1* | 11/2012 | Maske | B60K 13/04 | 248/636 |
| 2013/0000281 A1* | 1/2013 | Merchant | E02F 3/7609 | 60/295 |
| 2013/0319787 A1* | 12/2013 | Kobayashi | E02F 9/0866 | 180/309 |
| 2014/0311132 A1* | 10/2014 | Arai | E02F 3/764 | 60/286 |
| 2015/0211209 A1* | 7/2015 | Okuda | B60K 13/04 | 180/309 |
| 2015/0345360 A1* | 12/2015 | Himoto | E02F 9/0866 | 60/297 |

FOREIGN PATENT DOCUMENTS

| | | | | |
|---|---|---|---|---|
| JP | WO 2012127951 A1 * | 9/2012 | | B01D 46/0043 |
| WO | WO2011152306 | * 12/2011 | | B60K 13/04 |

* cited by examiner

PASSENGER SERVICE VEHICLE

REFERENCE TO RELATED APPLICATION

The application claims priority to United Kingdom Application No. 1304945.7 filed on Mar. 18, 2013.

TECHNICAL FIELD

The invention relates to the field of vehicles, such as passenger service vehicles and, for example, buses. In particular, but not exclusively, the invention relates to an exhaust system for a passenger vehicle. Further, the invention relates to, but is not limited to, a chassis for vehicles such as passenger service vehicles, as well as associated apparatus, structures, vehicles and methods.

BACKGROUND

Modern passenger service vehicles are increasingly required to provide efficiencies for vehicle operators in terms of greater number of passengers carried and increased fuel efficiency. The physical dimensions of a passenger service vehicle have a significant impact on overall vehicle efficiency.

In addition, certain jurisdictions have particular requirements for passenger vehicle dimensions, for example, size, weight, clearance and front and rear overhang.

SUMMARY

Generally, aspects of the invention provide apparatus configured to save space within a passenger service vehicle, such as a bus.

In some examples, there is provided a filter for an exhaust system of a passenger service vehicle. The filter includes an inlet and an outlet. The outlet may be substantially transverse to the inlet. The outlet may be substantially at right-angles to the inlet. The inlet may be inline with the filter. The outlet may be transversely arranged with reference to the filter.

The filter may include a particulate filter. The filter may include a catalytic converter. The filter may include a selective catalytic reduction filter.

In some examples, there is provided a passenger service vehicle exhaust system including a filter as described above.

In some examples, there is provided an exhaust system arranged to be on top of the engine compartment of a passenger service vehicle. The exhaust system may include a filter as described above.

There may also be provided a passenger service vehicle including an exhaust system as described above. The vehicle may be a bus.

The vehicle may have an overall length of about 35 feet or less. For example, the vehicle may have an overall length of between 25 feet and 35 feet. In some examples, the vehicle may have an overall length of approximately 35 feet. Such a vehicle may be configured to provide at least 35 passenger seats. Such a vehicle may have an unladen weight of around 25,000 lbs, or less (e.g., roughly 20,000 lbs, or even less).

In other examples, the vehicle may have an overall length of approximately 30 feet. Such a vehicle may be configured to provide at least 27 passenger seats. Such a vehicle may have an unladen weight of around 22,000 lbs or less (e.g, 18,000 lbs, or even less).

The vehicle may have a front overhang (i.e., a distance from the front of the vehicle to the center of a front axle) of around 250 cm, 230 cm or less (e.g, 226 cm). The vehicle may have a rear overhang (i.e., a distance from the rear of the vehicle to the center of a rear axle) of around 300 cm, 275 cm or less (e.g, 271 cm).

The vehicle may include a longitudinally mounted engine (e.g, a six cylinder longitudinally mounted engine). Such an engine may be compliant with, for example, environmental protection agency requirements. The vehicle may be a single-deck vehicle. The vehicle may include at least two passenger doors. The vehicle may include a vertical exit exhaust. The vehicle may include an air conditioning system. The conditions system may be mounted on the external of the vehicle. The conditioning system may be provided in a middle region of the vehicle.

BRIEF DESCRIPTION OF THE DRAWINGS

Exemplary embodiments of the invention are described with reference to the accompanying drawings, in which.

DETAILED DESCRIPTION

Generally disclosed herein is a filter for use in an exhaust system of a passenger service vehicle. Filters disclosed herein are configured to save space within a passenger service vehicle. Also disclosed herein are passenger service vehicle exhaust systems including the filter(s) and passenger service vehicles including the exhaust system(s). It is noted that the apparatus disclosed particularly relate to buses.

Figure 1:
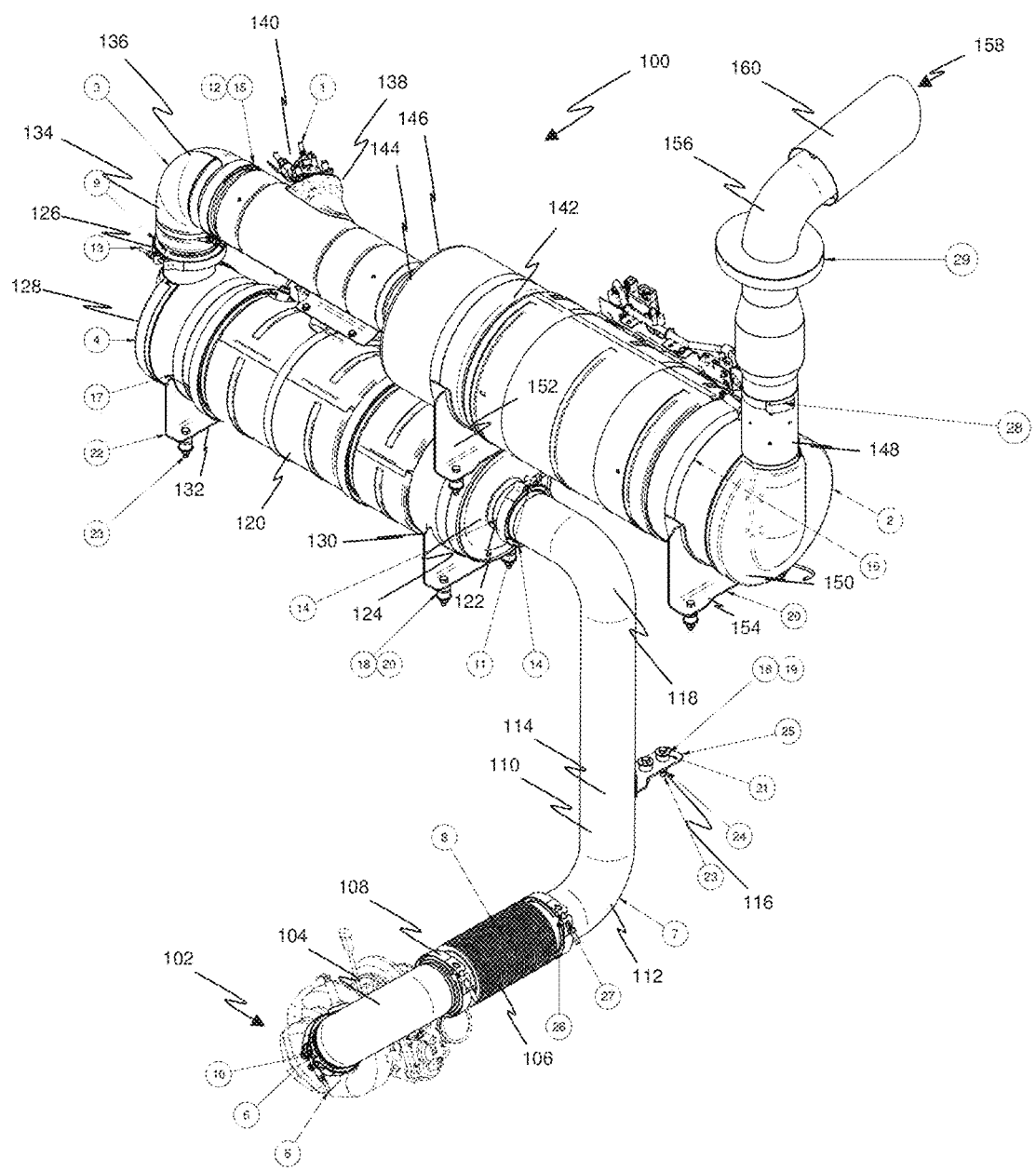
FIG. 1 is an isometric view of an exhaust system.

FIG. 1 shows a passenger service vehicle exhaust system 100. Table 1 below provides a list of the features of the exhaust system 100 to augment the description given herein. The item numbers of the features listed in Table 1 are referenced by the circled reference numerals provided in FIG. 1.

The exhaust system 100 has an engine fitment 102 for fitting the exhaust system 100 to an engine (not shown). The engine fitment 102 is configured to be fitted to an exhaust outlet of an engine. Various apparatus may be employed to secure the engine fitment 102 to an engine, as will be understood by a skilled person.

The engine fitment is connected to a first section of exhaust pipe 104. The first section of the exhaust pipe 104 extends from the engine fitment and includes a substantially right-angled bend. Therefore, the first section of exhaust pipe 104 is configured to carry exhaust fumes transversely away from the engine fitment 102.

The first section of the exhaust pipe 104 is connected to a length of flexible tubing 106. The flexible tubing 106 has an internal diameter configured such that the outer diameter of the first section of exhaust pipe 104 may be fitted inside the flexible tubing 106. The flexible tubing 106 may have an internal diameter greater than or equal to an outer diameter of the first section of exhaust pipe 104. Alternatively, the flexible tubing 106 may be elastically deformable such that it may be stretched over the first section of exhaust pipe 104. The flexible tubing 106 is connected at an engine end to the first section of exhaust pipe 104 by feeding a portion of the first section of exhaust pipe 104 partially into the flexible tubing 106 and securing the two together using a clip 108. The flexible tubing 106 is configured to absorb motion of the engine, to which the engine fitment 102 is connected, such that the motion is not transferred to the remainder of the exhaust system 100.

TABLE 1

| ITEM NO | PART NO | DESCRIPTION | QTY |
|---|---|---|---|
| 29 | 453714 | WA; EXHAUST STACK | 1 |
| 28 | 611005-7 | TEE BOLT HOSE CLIP | 1 |
| 27 | 661331 | CLAMP-4" MARMON V | 2 |
| 26 | 661327 | GASKET; 4" MARMON 2 mm | 2 |
| 25 | 454227 | WA; BRKT DOWNPIPE | 1 |
| 24 | MCN-508P | NUT FULL S/L MS | 10 |
| 23 | MCB-108-55P | BOLT M8 × 55 | 10 |
| 22 | 453869 | WA; DPF MTG SS | 2 |
| 21 | 441944 | WASHER M8 LARGE DIA | 10 |
| 20 | 453866 | WA; SCR MTG SS | 2 |
| 19 | 441945 | TUBE SPACER EXHST MTG | 10 |
| 18 | 661146 | MOUNT AV - HIGH TEMP | 20 |
| 17 | 662934 | CLAMP DPF | 2 |
| 16 | 662152 | CLIP EXHAUST | 2 |
| 15 | 662118 | CLAMP 5" STRAIGHT | 2 |
| 14 | 662114 | CLAMP 4" STRAIGHT | 1 |
| 13 | 662120 | CLAMP 4" SPHERICAL | 1 |
| 12 | 662119 | GASKET 5" STRAIGHT | 2 |
| 11 | 662115 | GASKET 4" STRAIGHT | 1 |
| 10 | 453705 | WA; EXHAUST TURBO OUT | 1 |
| 9 | 662121 | GASKET 4" SPHERICAL | 1 |
| 8 | 661323 | FLEX EXHAUST 4" | 1 |
| 7 | 453706 | WA; EXHAUST DPF IN | 1 |
| 6 | 661976 | GASKET, EXHAUST | 1 |
| 5 | 661409 | CLAMP - 3½" MARMON WIDE | 1 |
| 4 | 662959 | DPF - EPA 2013 | 1 |
| 3 | 662960 | ELBOW DPF TO SCR | 1 |
| 2 | 662961 | SCR - EPA 2013 | 1 |
| 1 | 862979 | DECOMPOSITION REACTOR | 1 |

The exhaust system generally runs from an inlet at an engine end to an outlet at an exhaust end. Therefore, the term "engine end" refers to an end of a feature closest to the engine along the path of the system 100. Accordingly, the term "exhaust end" refers to an end of a feature closest to the exhaust outlet along the path of the system 100.

A second section of exhaust pipe 110 is connected to the flexible tubing 106. The second section of the exhaust pipe 110 is connected to an exhaust end of the flexible tubing 106. The second section of the exhaust pipe 110 includes a first substantially right-angled bend 112.

The first bend 112 is configured to alter the direction of the exhaust system to be substantially vertical when the exhaust system 100 is fitted to a passenger service vehicle. This allows the exhaust system 100 to fit within the exhaust compartment of a bus, or other passenger service vehicle.

Stacking the exhaust system 100 in a vertical direction means that the length of a bus can be reduced. A central portion 114 of the second section of exhaust pipe 110 extends away from the first bend 112. The central portion 114 may therefore extend vertically. A fixing bracket 116 extends from the central portion 114 and is configured to secure the exhaust system 100 to the vehicle frame.

At an exhaust end of the central portion 114 is a second substantially right-angled bend 118 in the second section of exhaust pipe 110. The second bend 118 is configured to carry exhaust gases along a horizontal path within a passenger service vehicle.

A first filter 120 is connected to an exhaust end of the second section of exhaust pipe 110. The first filter 120 is a particulate filter. The exhaust end of the second section of exhaust pipe 110 is connected to an inlet 122 of the first filter 120 using a clip, as explained above.

The first filter 120 is generally cylindrical. The inlet 122 is positioned centrally in a first face 124 of the cylindrical first filter 120 at an engine end of the filter 120. Therefore, the inlet 122 is inline in that it is in the same direction as the direction of flow of exhaust gas through the first filter 120. When the exhaust system 100 is fitted to a vehicle, the inlet 122 is substantially horizontal.

An outlet 126 of the filter 120 is transverse to the inlet 122. The outlet 126 is substantially at right angles to the inlet 122. Further, the outlet 126 is transverse to the line of the filter 120 in that it extends in a direction transverse to the direction of flow of exhaust gas through the first filter 120. As a result, the outlet 126 extends in a vertical direction when the exhaust system 100 is fitted to a vehicle. The outlet 126 is generally cylindrical and is positioned at an exhaust end of the cylindrical filter 120. The outlet 126 overlaps the end of the filter 120 such that a part of a second face 128 of the filter 120 is rounded to correspond to a part of a cylindrical wall of the outlet 126. This can be seen more clearly on the second filter 142, which is discussed below.

The first filter 120 includes a plurality of fixing brackets 130, 132 configured to secure the first filter 120 to a vehicle frame.

The outlet 126 of the first filter 120 is connected to a third section of an exhaust pipe 134. An engine end of the third section of the exhaust pipe 134 is connected to the outlet 126 of the first filter using a clip, as explained above. The third section of the exhaust pipe 134 includes a substantially right-angled bend 136. Therefore, the third section of the exhaust pipe 134 is configured to fold the path of the exhaust system 100 back on itself. That is, the path of the exhaust system 100 returns in an opposite direction to the direction of flow of exhaust gas through the first filter 120.

A decomposition reactor 138 is connected to an exhaust end of the third section of the exhaust pipe 134. The decomposition reactor 138 includes an injection inlet 140 configured to allow diesel exhaust fluid to be injected into the exhaust system 100. The diesel exhaust fluid may be an aqueous urea solution for use in selective catalytic reduction for lowering the nitrogen oxide concentration in diesel exhaust emissions. Other fluids suitable for selective catalytic reduction, such as anhydrous ammonia or aqueous ammonia, may be used.

A second filter 142 is a selective catalytic reduction filter and is connected to an exhaust end of the decomposition reactor 138. The exhaust end of the decomposition reactor 138 is connected to an inlet 144 of the second filter 142 using a clip, as explained above.

The second filter 142 is generally cylindrical. The inlet 144 is positioned centrally in a first face 146 of the cylindrical second filter 142 at an engine end of the filter 142. Therefore, the inlet 144 is inline in that it is in the same direction as the direction of flow of exhaust gas through the second filter 142. When the exhaust system 100 is fitted to a vehicle, the inlet 144 is substantially horizontal.

An outlet 148 of the filter 142 is transverse to the inlet 144. The outlet 148 is substantially at right angles to the inlet 144. Further, the outlet 148 is transverse to the line of the filter 142 in that it extends in a direction transverse to the direction of flow of exhaust gas through the second filter 142. As a result, the outlet 148 extends in a vertical direction when the exhaust system 100 is fitted to a vehicle. The outlet 148 is generally cylindrical and is positioned at an exhaust end of the cylindrical second filter 142. The outlet 148 overlaps the exhaust end of the filter 142 such that a part of a second face 150 of the filter 142 is rounded to correspond to a part of a cylindrical wall of the outlet 148.

The second filter 142 includes a plurality of fixing brackets 152, 154 configured to secure the filter 142 to a vehicle frame.

The outlet 148 of the second filter 142 is connected to a fourth section of an exhaust pipe 156, which passes exhaust gases through an exhaust system outlet 158. The exhaust system outlet 158 includes a silencer 160.

In use, exhaust gases are emitted from an engine and into the engine fitment 102. The gases are passed through the first section of exhaust pipe 104, the flexible tubing 106 and the second section of exhaust pipe 110 and into the first filter 120. The first filter 120 removes particulate from the exhaust gases, which then pass through the third section of exhaust pipe 134 and into the decomposition reactor 138. Diesel exhaust fluid is injected into the exhaust gases through the injection inlet 140, and the second filter 142 undertakes selective catalytic reduction before the exhaust gases are emitted from the exhaust system outlet 158 via the fourth section of exhaust pipe 156.

Figure 2A:
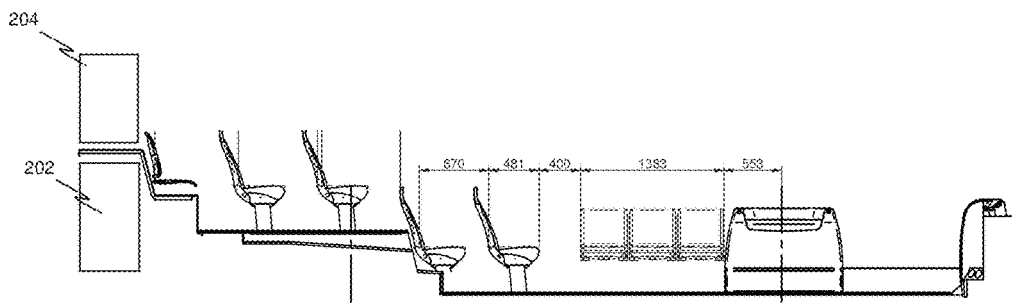
FIG. 2a is a schematic representation of the layout of a bus.
Figure 2B:
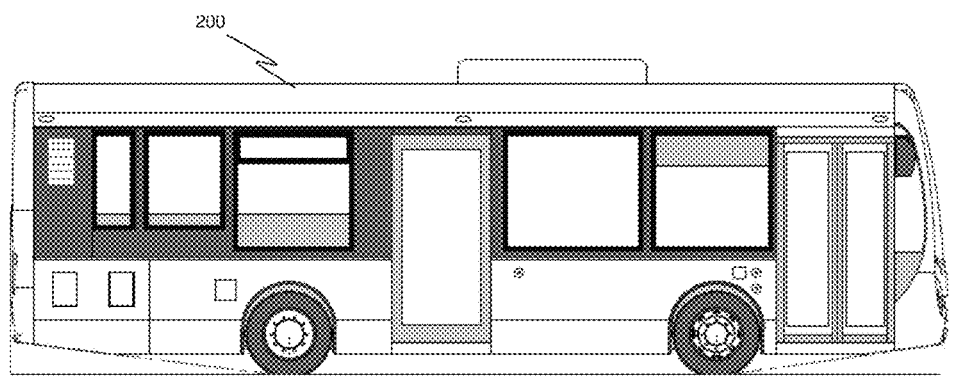
FIG. 2b is a side elevation of a bus.

FIG. 2a shows the arrangement of certain elements of a bus 200 within a vehicle frame. FIG. 2b shows a side elevation of a bus including the exhaust system 100.

Referring to FIG. 2a, an engine compartment 202 may be generally defined and is configured to hold an engine of the bus 200. Further, an exhaust system compartment 204 can be generally defined and is configured to hold the exhaust system 100. It can be seen from FIG. 2a that stacking the exhaust system 100 in the vertical manner shown in FIG. 1 allows the length of the bus 200 to be reduced.

The skilled person will be able to envision further embodiments of the invention without departing from the scope of the invention as disclosed herein.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An exhaust system arranged, in use, to be above an engine compartment of a passenger service vehicle, the exhaust system comprising:
a first filter and a second filter, each of the first filter and the second filter having an inlet and an outlet, the inlets being inline with the respective first and second filters such that the inlets extend in the same direction as the first and second filters, and the outlets being transversely arranged with reference to the respective first and second filters, and wherein the exhaust system is configured such that, in use, exhaust fluid flows in the first filter in a first direction and subsequently flows in the second filter in a second direction, the first direction and the second direction being opposite.

2. The exhaust system according to claim 1, wherein one of the first filter and the second filter comprises a particulate filter.

3. The exhaust system according to claim 1, wherein one of the first filter and the second filter comprises a catalytic converter.

4. The exhaust system according to claim 1, wherein the first filter and second filter are arranged substantially parallel to one another.

5. The exhaust system according to claim 1, wherein the outlet from the second filter is arranged vertically with respect to the passenger service vehicle when attached with the passenger service vehicle.

6. The exhaust system according to claim 1, wherein, when the exhaust system is fitted to the passenger service vehicle, the inlet of the first filter is fluidly connected, via one or more bends of pipe section, to a vertical section of the exhaust system.

7. The exhaust system according to claim 6, wherein the exhaust system is in fluid communication with a flexible tubing for fluid connection to an engine.

8. A passenger service vehicle comprising:
an engine compartment comprising an engine; and
an exhaust system comprising a first filter and a second filter, each of the first filter and the second filter having an inlet and an outlet, the inlets being inline with the respective first and second filters such that the inlets extend in the same direction as the first and second filters, and the outlets being transversely arranged with reference to the respective first and second filters and wherein the exhaust system is configured such that, in use, exhaust fluid flows in the first filter in a first direction and subsequently flows in the second filter in a second direction, the first direction and the second direction being opposite.

9. The passenger service vehicle according to claim 8, wherein the first filter and the second filter are arranged substantially parallel to one another.

10. The passenger service vehicle according to claim 8, wherein the outlet from the second filter is arranged vertically with respect to the passenger service vehicle.

11. The passenger service vehicle according to claim 8, wherein, when the exhaust system is fitted to the passenger service vehicle, the inlet or the first filter is fluidly connected, via one or more bends of pipe section, to a vertical section of the exhaust system.

12. The passenger service vehicle according to claim 8, wherein the engine is longitudinally mounted with respect to the passenger service vehicle.

13. The passenger service vehicle according to claim 8, wherein the passenger service vehicle is a single deck vehicle.

* * * * *

UNITED STATES PATENT AND TRADEMARK OFFICE
CERTIFICATE OF CORRECTION

PATENT NO. : 9,732,647 B2
APPLICATION NO. : 14/218423
DATED : August 15, 2017
INVENTOR(S) : Mark Daborn et al.

It is certified that error appears in the above-identified patent and that said Letters Patent is hereby corrected as shown below:

Column 3

1. In Table 1, Line 6 as issued, please make the following corrections:

| 24 | MCN-508P | NUT FULL S/L [[MS]]M8 | 1 0 |
|---|---|---|---|

2. In Table 1, Line 29 as issued, please make the following corrections:

| 1 | ~~862979~~662 979 | DECOMPOSITION REACTOR | 1 |
|---|---|---|---|

Signed and Sealed this
Third Day of October, 2017

Joseph Matal
*Performing the Functions and Duties of the*
*Under Secretary of Commerce for Intellectual Property and*
*Director of the United States Patent and Trademark Office*